June 25, 1957 R. P. AUD 2,797,121
COMBINED HOLD-DOWN WEIGHT AND BUMPER GUARD FOR TRACTORS
Filed July 20, 1954
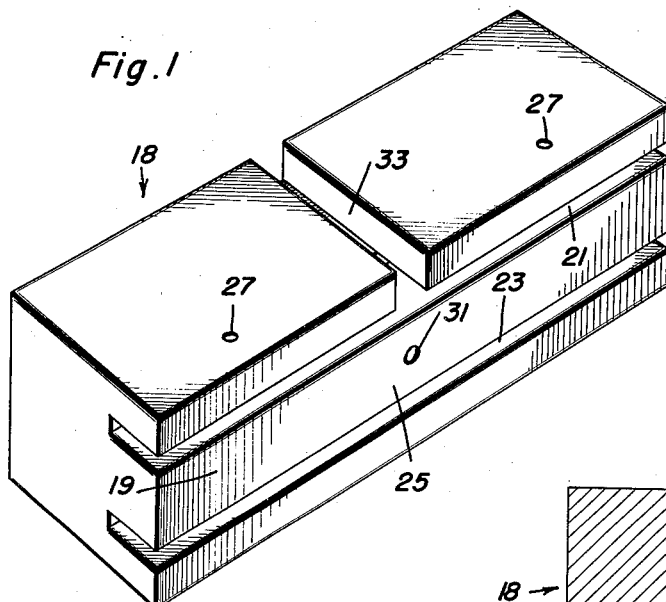
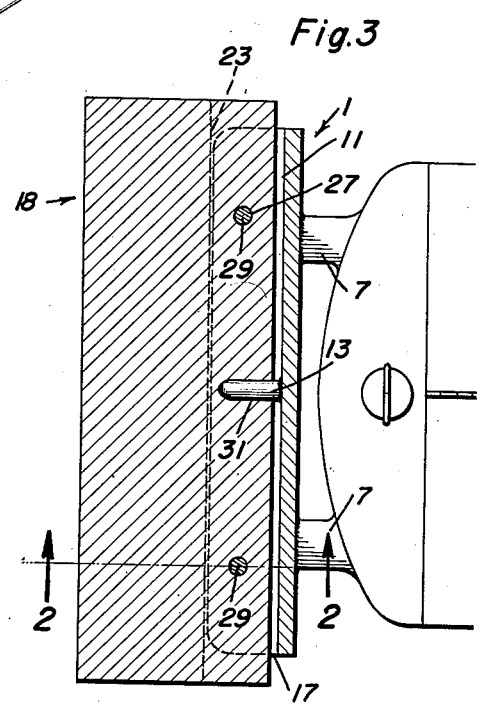
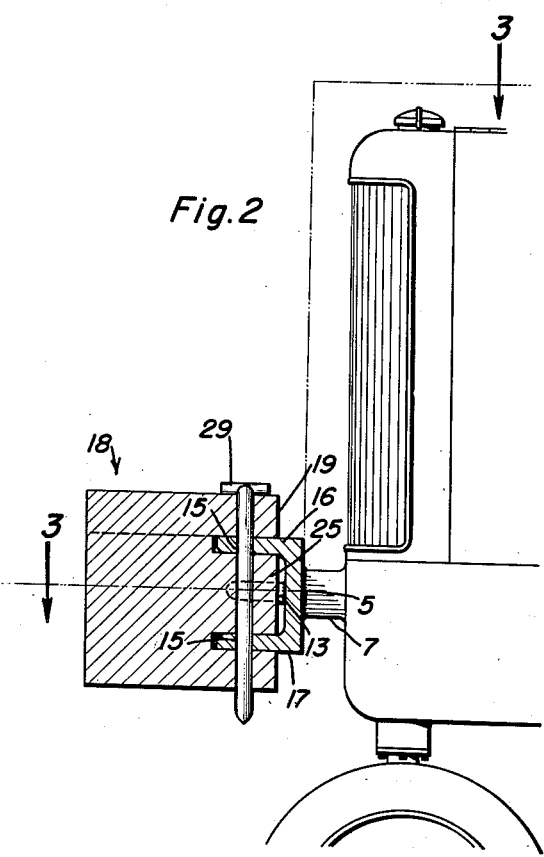
Robert P. Aud
INVENTOR.

United States Patent Office 2,797,121
Patented June 25, 1957

2,797,121
COMBINED HOLD-DOWN WEIGHT AND BUMPER GUARD FOR TRACTORS

Robert P. Aud, Whitesville, Ky.

Application July 20, 1954, Serial No. 444,530

2 Claims. (Cl. 293—99)

My invention relates to improvement in combined hold-down weights and bumper guards for the front end of farm tractors.

By way of premise, certain makes of farm tractors are equipped with a cultivator attaching transverse channel bar at the front thereof having the channel facing forwardly and provided with a center forwardly extending line pin and vertical pin receiving holes at opposite sides of the transverse center of the bar for cultivator attaching purposes.

The primary object of my invention is to provide a hold-down weight and bumper guard which is adapted for easy, quick attachment to the cultivator attaching bar of such tractors by pins extending through the pin receiving holes in the bar and which is especially designed to interfit with the channel bar and the center line pin of the bar to facilitate attaching the weight by means of the pins.

Other and subordinate objects together with the precise nature of my improvements will become readily apparent when the following description and claims are read with reference to the drawing accompanying and forming part of this specification and in which:

Figure 1 is a view in perspective of my combined hold-down weight and bumper guard in the preferred embodiment thereof;

Figure 2 is a fragmentary view partly in side elevation and partly in vertical transverse section illustrating the manner in which the combined hold-down weight and bumper guard is attached to the channel bar of the tractor, the view being taken on the line 2—2 of Figure 3, and Figure 3 is a fragmentary view in horizontal section taken on the line 3—3 of Figure 2.

Referring to the drawing by numerals, 1 designates the transverse front cultivator attaching channel bar which, as will be seen, extends forwardly of the tractor 3 and is bolted, as at 5, to studs 7 on the front of the chassis frame 9, with its channel 11 facing forwardly, a center line pin 13 extending forwardly into the channel 11, and pin receiving holes 15 in the bar 1 vertically aligned in pairs in upper and lower flanges 16, 17 of said bar 1, one of the pairs being clearly shown in Figure 2.

The combined hold-down weight and bumper guard, designated generally by the numeral 18, is of oblong, rectangular form, and any suitable material, and is adapted to extend longitudinally along the bar 1 in forwardly extending position relative thereto and to be supported thereby. For this purpose, said weight and bumper guard 18 is provided with a rear side 19 having a pair of upper and lower longitudinal grooves 21, 23 which are spaced apart in correspondence with the upper and lower flanges 16, 17 to slidably fit over the same and provide a longitudinal rib 25 between said grooves 21, 23 co-extensive therewith and slidably fitting in the channel 11.

A pair of vertical bores 27 are provided in the weight and bumper guard 18 upon opposite sides of its transverse center and which are spaced apart in accordance with the spacing of the pairs of holes 15 to receive headed locking pins 29 received in said pairs of holes 15 to secure said weight and bumper guard to said bar 1.

A horizontal transverse socket 31 is provided in the rear side 19 of the weight and bumper guard 18 to fit over the center pin 13 so that said weight and bumper guard may be slid rearwardly onto said bar 1 and pin 13 in centered position relative to said bar and whereby the bores 27 can be easily and quickly aligned with the pairs of holes 15 for insertion of the locking pins 29.

A transverse center slot 33 is provided in the top of said weight and bumper guard 18 to accommodate a starting crank, not shown, for the engine of certain types of tractors.

As will be seen, from the drawing, the weight and bumper guard 18 is of a width to extend well forwardly of said bar 1 to function efficiently as a bumper guard.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

What is claimed as new is as follows:

1. In combination with a forwardly opening transverse channel bar on the front end of a tractor and having a horizontal center pin in the channel and pairs of vertically spaced pin receiving holes therein on opposite sides of its transverse center, of a combined hold-down weight and bumper guard extending along and coextensive in length with said bar and having a rear face provided with longitudinal grooves open from end to end of said guard and fitting over the flanges of the channel bar, a socket fitting over said pin, and pins extending through said pairs of holes and securing said weight to said bar.

2. The combination of claim 1, said rear face having a longitudinal rib therein vertically thicker than the depth of each groove fitting in the channel of said bar.

References Cited in the file of this patent
UNITED STATES PATENTS

| | | |
|---|---|---|
| 209,890 | Hein | Nov. 12, 1878 |
| 1,053,201 | Moore | Feb. 18, 1913 |
| 1,121,060 | Ball | Dec. 15, 1914 |
| 2,325,089 | Zeilmon | July 27, 1943 |
| 2,545,739 | Martin | Mar. 20, 1951 |
| 2,693,250 | Barrett | Nov. 2, 1954 |
| 2,701,728 | Miller | Feb. 8, 1955 |